(12) United States Patent
Binkin et al.

(10) Patent No.: US 12,517,594 B2
(45) Date of Patent: Jan. 6, 2026

(54) MULTIPLE LANGUAGES KEYBOARD

(71) Applicant: MKNL TECHNOLOGY LTD., Ramat Gan (IL)

(72) Inventors: Daniel Binkin, Tel Aviv (IL); Alex Alexeev, Tel Aviv (IL); Michael Mirkin, Ramat Gan (IL)

(73) Assignees: MKNL TECHNOLOGY LTD., Tel Aviv (IL); A.B. MECHANICAL ENGINEERING AND CONSULTING LTD, Haifa (IL)

( * ) Notice: Subject to any disclaimer, the term of this patent is extended or adjusted under 35 U.S.C. 154(b) by 0 days.

(21) Appl. No.: 18/856,924

(22) PCT Filed: Mar. 27, 2024

(86) PCT No.: PCT/IL2024/050314
§ 371 (c)(1),
(2) Date: Oct. 15, 2024

(87) PCT Pub. No.: WO2024/201461
PCT Pub. Date: Oct. 3, 2024

(65) Prior Publication Data
US 2025/0251802 A1    Aug. 7, 2025

Related U.S. Application Data

(60) Provisional application No. 63/455,562, filed on Mar. 30, 2023.

(51) Int. Cl.
*G06F 3/023* (2006.01)

(52) U.S. Cl.
CPC .................... *G06F 3/0238* (2013.01)

(58) Field of Classification Search
CPC ........................................ G06F 3/0238
See application file for complete search history.

(56) References Cited

U.S. PATENT DOCUMENTS

| | | |
|---|---|---|
| 4,772,769 A | 9/1988 | Shumate |
| 5,408,060 A | 4/1995 | Muurinen |
| 5,950,809 A | 9/1999 | Andre |
| 6,281,812 B1 | 8/2001 | Kim |
| 6,310,609 B1 | 10/2001 | Morgenthaler |
| 6,608,271 B2 | 8/2003 | Duarte |
| 6,704,004 B1 | 3/2004 | Ostergard et al. |
| 6,761,462 B2 | 7/2004 | Yoshida |
| 7,070,290 B2 | 7/2006 | Lee |
| 7,239,303 B2 | 7/2007 | Liao et al. |
| 7,271,360 B2 | 9/2007 | Kobayashi |
| 7,333,031 B1 | 2/2008 | Bantner |
| 7,397,467 B2 | 7/2008 | Park et al. |
| 8,350,172 B2 | 1/2013 | Tsai et al. |
| 8,383,971 B2 | 2/2013 | Liu |
| 8,383,972 B2 | 2/2013 | Liu |

(Continued)

FOREIGN PATENT DOCUMENTS

WO    WO/2013/174394    11/2013

*Primary Examiner* — Afroza Chowdhury
(74) *Attorney, Agent, or Firm* — SOROKER AGMON NORDMAN RIBA (57) ABSTRACT

An illuminated keyboard, including one or more keys with multiple symbols thereon, wherein one symbol on each key is illuminated. wherein the symbol that is illuminated is active and transmitted by the keyboard when pressing the key.

20 Claims, 6 Drawing Sheets

(56) References Cited

U.S. PATENT DOCUMENTS

| | | | |
|---|---|---|---|
| 9,224,555 B2 | 12/2015 | Lee | |
| 9,563,281 B2 | 2/2017 | Sellers | |
| 9,640,346 B2 | 5/2017 | Cai | |
| 9,711,301 B2 | 7/2017 | Plancherel et al. | |
| 9,838,006 B2 | 12/2017 | Chen | |
| 10,067,938 B2 | 9/2018 | Bellegarda et al. | |
| 10,381,176 B2 | 8/2019 | Peterson et al. | |
| 10,394,338 B2 | 8/2019 | Yang | |
| 10,592,601 B2 | 3/2020 | Pagallo et al. | |
| 10,775,900 B2 | 9/2020 | Wu et al. | |
| 10,963,067 B2 * | 3/2021 | Autio | H01H 13/023 |
| 11,217,405 B2 | 1/2022 | Ho | |
| 2001/0026446 A1 * | 10/2001 | Yoshida | H04M 1/22 |
| | | | 362/184 |
| 2003/0132915 A1 * | 7/2003 | Mitchell | G06F 3/0238 |
| | | | 345/168 |
| 2005/0068292 A1 * | 3/2005 | Duarte | G06F 3/0238 |
| | | | 345/156 |
| 2006/0037848 A1 * | 2/2006 | Kobayashi | H04M 1/22 |
| | | | 200/310 |
| 2006/0061542 A1 | 3/2006 | Stokic | |
| 2009/0045986 A1 | 2/2009 | Fabrenius et al. | |
| 2012/0119997 A1 | 5/2012 | Gutowitz | |
| 2013/0297289 A1 | 11/2013 | Clow et al. | |
| 2015/0138096 A1 * | 5/2015 | Peterson | G06F 3/0202 |
| | | | 345/170 |
| 2015/0293605 A1 | 10/2015 | Deghdak | |
| 2016/0004329 A1 | 1/2016 | Myers et al. | |
| 2017/0003754 A1 * | 1/2017 | Geary | G06F 3/0238 |
| 2017/0117105 A1 * | 4/2017 | Chen | H01H 13/702 |
| 2019/0332186 A1 * | 10/2019 | Petersen | G06F 3/0202 |
| 2020/0272244 A1 * | 8/2020 | Autio | G06F 3/0219 |
| 2022/0223063 A1 * | 7/2022 | Seale | G09B 13/00 |

* cited by examiner

MULTIPLE LANGUAGES KEYBOARD

TECHNICAL FIELD

The present disclosure relates to a keyboard that includes symbols of letters for several languages, and more specifically to a keyboard that displays each of the plurality of languages separately.

BACKGROUND OF THE DISCLOSURE

Current keyboards often display symbols of two or more languages on the keys of the main area of a keyboard. Typically, the symbols are etched or printed onto the keys, such that letters of both the languages are permanently displayed by the keyboard. This might cause many typing mistakes, as during typing the eyes of the user glance at the symbols of the language desired for the current typing task for confirmation. However if the user mistakenly selected a different language the resulting letters on the screen will be incorrect, while the user thinks that he is typing the correct letters.

In some keyboards, the display of various characters onto keyboard keys is implemented via a single screen (e.g., an LCD/OLED/EPAPER screen) or a plurality of miniature screens (e.g., an LCD/OLED/EPAPER) screen. Keyboards that comprise screens are extremely expensive to produce, are less reliable over time (typically require flex cables in the moving part of the button), are not pleasant to use because of the hardware in the top part of the buttons, and similarly to any screen are harmful to the eyes of the user.

There is thus a need for a keyboard that would ease user operation and make typing less confusing, while being user friendly, reliable, and cost effective.

SUMMARY OF THE DISCLOSURE

An aspect of an embodiment of the disclosure relates to a keyboard that is configured to display thereon symbols or characters, e.g., letters, of a plurality of languages on each key. The symbols of each language are displayed separately in different areas of the keys of the keyboard. During use, letters of a same specific language are illuminated to be visible to the user, to avoid confusion of the user to prevent mixing up typing of letters of different languages.

Another aspect of the disclosure relates to a key of a keyboard that includes a plurality of separate light sources located beneath the key, each light source positioned at a different area of the key. The key includes partitions to separate each of the light sources from the rest of the light sources. Accordingly, light from any of the light sources does not reach other areas of the key except for the area designated for that specific light source, and which is defined by the partitions. Each light source is configured to illuminate only a corresponding and designated area of the key, thereby enabling display of only the illuminated area, i.e., of a letter of a specific language, without illuminating the other areas of the keyboard key that include letters of other languages.

There is thus provided according to an embodiment of the disclosure, an illuminated keyboard, comprising:
One or more keys with multiple symbols thereon;
Wherein one symbol on each key is illuminated;
Wherein the symbol that is illuminated is active and transmitted by the keyboard when pressing the key.

In an embodiment of the disclosure, the active symbols of the one or more keys represent a layout of a language. Optionally, the symbols of the layout of the language match a selected language that is indicated on a display of a computer using the keyboard. In an embodiment of the disclosure, the active symbols of the one or more keys are toggled by pressing a pre-selected key or key sequence. Alternatively or additionally, the active symbols of the one or more keys are toggled by a program on a computer connected to the keyboard. Alternatively or additionally, the active symbols of the one or more keys are toggled by a selection switch or buttons on the keyboard.

In an embodiment of the disclosure, the keyboard comprises a circuit with a light source for each symbol of each key of the one or more keys and a controller that selects which light sources will be turned on and which will be turned off. Optionally, the symbols on the keys are perforated or transparent to release light from a respective light source from under the symbol. In an embodiment of the disclosure, a partition is formed under each key with multiple symbols, the partition comprising walls that prevent light from a light source illuminating a symbol, from illuminating other symbols on the key. Optionally, the keyboard comprises a circuit with a light source for each symbol of each key and the symbols of different keys for each language or layout are of the same color. In an embodiment of the disclosure, the keyboard comprises a circuit with a light source for each symbol of each key and the symbols of different keys for different languages or layouts are a different color. Optionally, the symbols of a specific language are located in a same area on all the keys of the keyboard with symbols of the language.

In an embodiment of the disclosure, wherein pressing the "shift" key causes the keyboard to cease illumination of the numeric keys at the top of the keyboard and to commence illumination of the symbols above the numeric keys. Optionally, the keyboard includes different groups of keys with a different number of symbols per key. In an embodiment of the disclosure, the keyboard is formed by applying a retrofit kit to a standard keyboard. Optionally, the retrofit kit includes a flexible printed circuit that fits over underlying switches of the keys of the keyboard, a controller to control illumination of light sources on the flexible printed circuit and replacement keycaps for the keys that will be illuminated. In an embodiment of the disclosure, the keyboard is synchronized with the computer such that the illuminated symbols on the keyboard correspond to an indication on the computer display.

There is further provided according to an embodiment of the disclosure, a method of illuminating a keyboard, comprising:
Providing a keyboard with one or more keys with multiple symbols thereon;
Illuminating one symbol on each key to signify that it is active;
Transmitting, by the keyboard, the symbol that is active when pressing the key.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

The present disclosure relates to keyboard keys and a keyboard that include a plurality of languages thereon, while displaying letters of each language separately, per user demand. Thus, the keyboard and keys of the present disclosure ease use of the keyboard, by reducing possibility of confusion between letters of different languages, since only letters of a single language are illuminated simultaneously.

Figure 1:
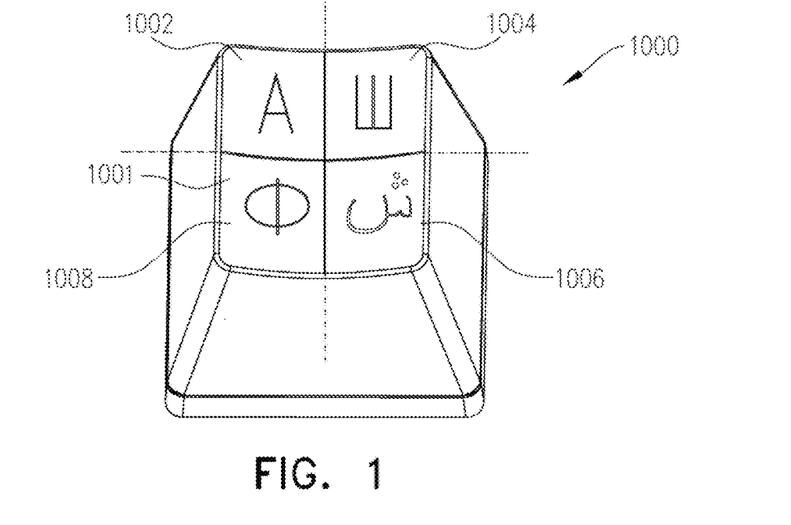
FIG. 1 is a schematic illustration of a top view of an exemplary keyboard key, according to an embodiment of the disclosure.

Reference is now made to FIG. 1, which is a schematic illustration of a top view of an exemplary keyboard key 1000, according to an embodiment of the disclosure. According to some embodiments, a keyboard key 1000, which is a mere example for a keyboard key of the present disclosure, may comprise a plurality of areas onto which different symbols, e.g., letters, of different languages may be displayed. For example, in case a keyboard is to enable typing in four different languages, the keyboard is required to provide display of those four different languages, separately from one another. In such a case, keyboard key 1000 is divided into four different areas, each configured to display a letter from one of the four different languages.

In the example of four different languages, area 1002 of keyboard key 1000 may be configured to display, for example, a letter from the English language, e.g., 'A'. Area 1004 of keyboard key 1000 may be configured to display a letter from the Hebrew language. e.g., 'צ'. Area 1006 of keyboard key 1000, may be configured to display a letter from the Arabic language, e.g., 'ش', and area 1008 of keyboard key 1000 may be configured to display a letter from the Russian language, e.g., the letter 'Ф'. It should be clear that for other embodiments, the disclosed location of the different letters with respect to keyboard key 1000, as well as the selected different languages, and the number of selected languages, may be different.

Figure 2:
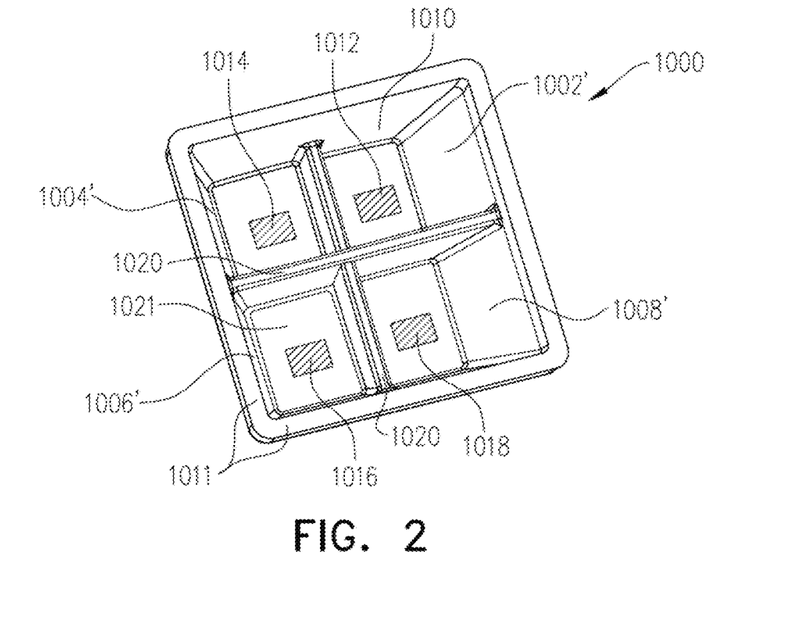
FIG. 2 is a schematic illustration of a bottom view of an exemplary keyboard key, according to an embodiment of the disclosure.

In some embodiments, as illustrated in FIG. 2, each of the different areas of keyboard key 1000 may be illuminated separately once a respective language is selected by the user, and the other areas of keyboard key 1000 that relate to a different language from the one selected, would not be illuminated and thus the letters in those areas would be unnoticeable or not visible to the user. Accordingly, the keyboard would only illuminate one language at a time, per user demand, such that only letters related to the chosen language would be illuminated on the keyboard keys, thereby reducing user typing errors that occur with current keyboards that constantly display more than one language. For example, when selecting English (e.g., by the computer operating system), the English symbols (area 1002) on the keyboard keys 1000 will be illuminated so that when the user glances at the keys he/she will only see the symbols that will be currently typed when selecting a specific key. Accordingly, the user will not accidentally think that a different symbol from those appearing on the key will be used. If the user accidentally selected a different language in the computer, when glancing at the keyboard he/she will immediately realize their mistake. Currently with standard keyboards, the user has no indication from the keyboard keys 1000, which of the (e.g., four) symbols that appear on the key 1000 will be used.

In some embodiments, each of the keyboard keys 1000, may comprise an engraving or perforation on the top side 1001 of keyboard key 1000, the engraving/perforation being in the shape of the desired letters per the different languages that the keyboard is configured to display. The engraving/perforation would appear in each of the different areas of keyboard key 1000, e.g., areas 1002, 1004, 1006, and 1008. The engraving/perforation is configured to allow light to pass therethrough and thereby make the letter of the chosen language to be noticeably displayed on keyboard key 1000, for example by forming a cut out area on top side 1001 over a LED light within the key. The user would only consider illuminated keys as active. In some embodiments, the engraving/perforation on the top side 1001 of keyboard key 1000 may be covered by a transparent layer, to cover the openings within keyboard key 1000 created by the engraving/perforation and prevent dirt from entering the engraving/perforation, which might block the light and distort the shape of the displayed letter.

In other embodiments, each of the keyboard keys 1000 may be manufactured by Double injection molding or Double shot injection, such that different areas of the keyboard keys may be made of a different material and/or different color. Accordingly, the area of the keyboard key 1000 that is configured to display the different languages thereon, may be made, for example, from a transparent or semi-transparent material to enable light to pass therethrough and be noticed by a user, whereas the surrounding areas of the keyboard keys may be made from an opaque and possibly different material.

Each of the keyboard keys 1000, may be made of a rigid plastic, though other materials may be used.

In some embodiments, the symbols/letters of the different languages are engraved/perforated on keyboard key 1000, a transparent cover configured to cover each of the keyboard keys, may be made of a thin plastic, e.g., a plastic film or other materials, such as silicone.

In some embodiments, the engraving or perforation may be done by laser, by a metal rod or other methods may be implemented.

Reference is now made to FIG. 2, which is a schematic illustration of a bottom view of an exemplary keyboard key 1000, according to embodiments of the present disclosure. In some embodiments, keyboard key 1000 may comprise a bottom side 1010, which may be correspondingly divided into the designated areas of top side 1001. For example, the bottom side of area 1002 is 1002', the bottom side of area 1004 is 1004', the bottom side of area 1006 is 1006', and the bottom side of area 1008, is 1008'.

According to an embodiment of the disclosure, separate light sources may be positioned at the bottom side 1010 of keyboard key 1000, per each of its separate areas. Each of the light sources may be configured to illuminate the corresponding engraved/perforated letter that the illumination source is located beneath of. For example, light source 1012 may be positioned in bottom area 1002' and be configured to illuminate the letter engraved at the top side 1001 of keyboard key 1000, e.g., the letter 'A'. Light source 1014 may be positioned in bottom area 1004' and be configured to illuminate the letter engraved at the top side 1001 of keyboard key 1000, e.g., letter 'ש'. Light source 1016 may be positioned in bottom area 1006' and be configured to illuminate the letter engraved at the top side 1001 of keyboard key 1000, e.g., letter 'ض'. Light source 1018 may be positioned in bottom area 1008' and be configured to illuminate the letter engraved at the top side 1001 of keyboard key 1000, e.g., letter 'Ф'.

Optionally, below each area of the keyboard key there is located a light source, and each light source is separated from the other light sources with a partition 1020. Partition 1020 may comprise walls that are positioned to block light illuminating from one light source located therebetween from reaching a different area of keyboard key 1000 that it should not reach. That is, partition 1020 is configured to prevent light from other light sources to reach an area of a letter that was not of the language chosen by the user and thus should thus not be illuminated and displayed to the user, at that time.

In some embodiments, keyboard key 1000 may comprise raised edges 1011 surrounding the bottom side 1010, thereby creating a space 1021 into which partition 1020 and the corresponding light sources may be positioned. Partition 1020 along with the edges 1011 of keyboard key 1000 may create a designated area into which each of the plurality of light sources may be inserted, while preventing light from an operated light source from reaching another different designated area. For example, light from a light source 1012 located at designated area 1002' may not reach the other designated areas 1004', 1006', nor 1008', since light from light source 1012 is blocked by the walls of partition 1020 and by the raised edges 1011 of keyboard key 1000. Thus, light from light source 1012 is configured to illuminate the engraving/perforation at the top side 1001 of keyboard key 1000, thereby displaying the letter of area 1002 alone, without even partially illuminating the other areas of keyboard key 1000 that comprise letters of different non-selected languages.

In case the keyboard is configured to provide a display of four different languages, partition 1020 may be in the shape of two walls positioned perpendicularly to one another, thereby creating four equally sized areas within which four separate light sources may be positioned, e.g., areas 1002', 1004', 1006', and 1008'. Other shapes and configurations of partition 1020 may be implemented, typically depending on the number of languages to be displayed by die keyboard, as well as their location along the top side 1001 of keyboard key 1000.

In an embodiment of the disclosure, four light sources, e.g., light sources 1012, 1014, 1016 and 1018, may be operated independently from one another, to thereby control separate display of the letters of each language alone. Independent operation of the light sources may be controlled by the computer used by the user, based on a language selection by the user.

In some embodiments, the different light sources may comprise a different color (e.g., a specific color for each language), though in other embodiments, all light sources may illuminate the same color.

The color of each key 1000 should typically be different from the color of light illuminated therethrough, to be sufficiently visible to the user. For example, the color of the keyboard keys may be of a dark shade, e.g., black, while the light illuminated therethrough may be of a bright shade. e.g., white or yellow. In other embodiments, bright colors may be used for the color of die keyboard keys while the color of the illuminated light may be of a significantly different shade in order to be adequately visible compared to the color of the keys. Any other combinations of colors between the keys and the light sources may be used.

In some embodiments, the light sources, e.g., light sources 1012, 1014, 1016 and 1018, may be positioned under each keyboard key 1000 while being mounted on a specially manufactured carrier, for example, a conductive film with conductive lines.

In some embodiments, a power source (e.g., from a computer 420 or battery) may provide power to each of the light sources via a circuit board 450 connecting between the power source and the light sources, possibly via switches 405, as detailed below with respect to FIG. 4.

In some embodiments, the total power consumption of the keyboard 410 (e.g., FIGS. 3A and 3B) corresponds to the sum of a single illuminated light source (1012, 1014, 1016, 1018) for each key 1000, since one light source is operated by one switch 405 at a time so that the user can identify, which language/key layout is active at any moment.

Figures 3A, 3B:
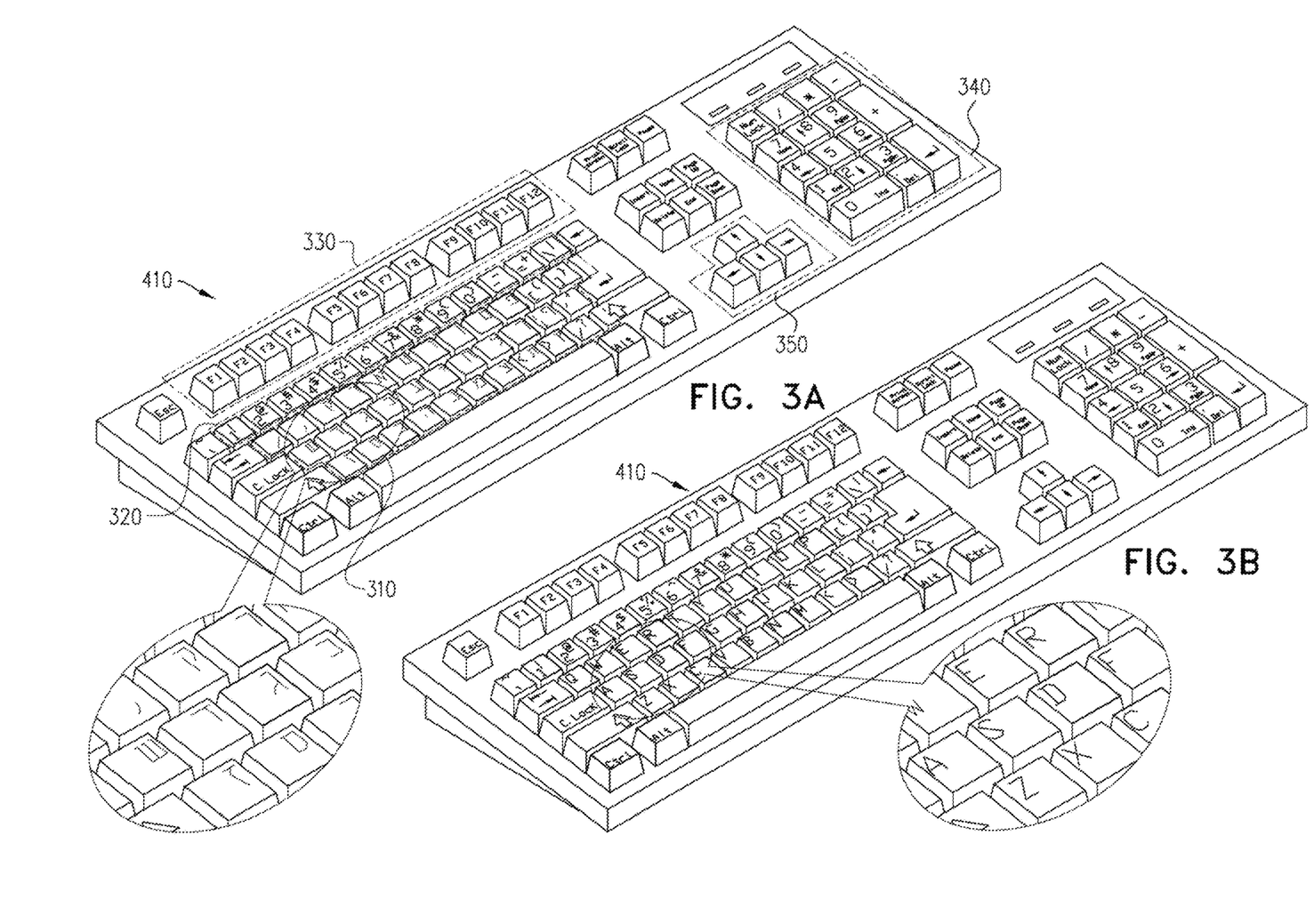
FIGS. 3A-3B are schematic illustrations of a keyboard separately displaying letters of two different representative languages, according to an embodiment of the disclosure.

Reference is now made to FIGS. 3A-3B, which are schematic illustrations of a keyboard 410 separately displaying letters of two different representative languages, according to embodiments of the present disclosure. In the example, where keyboard 410 comprises multiple languages, e.g., English, Hebrew, Arabic and Russian, keyboard 410 may be configured to display onto its keys, each of the languages separately, as illustrated in the examples of FIGS. 3A-3B. FIG. 3A schematically illustrates keyboard 410 displaying only Hebrew letters, whereas FIG. 3B illustrates keyboard 410 displaying only English letters. The keyboard of the present disclosure may be configured to display other languages at various areas (1002, 1004, 1006, 1008) per each key, or similar languages at different areas per each key, for example English with different layouts in different areas (e.g., Dvorak, QWERTY). Optionally, the keyboard includes a few groups of keys, for example letter keys 310, upper numeric keys 320, function keys 330, numeric keypad keys 340, arrow keys 350 and other areas. In some embodiments, only the letter keys 310 participate in illuminating different symbols based on the selected language. Alternatively, other areas may also enable selecting between different symbols, for example the upper numeric keys 320 may toggle between numbers and other symbols responsive to pressing the "Shift" key. Likewise the numeric keypad keys 340 may toggle between numbers and arrows responsive to toggling the "Num lock" key.

Figure 4A:
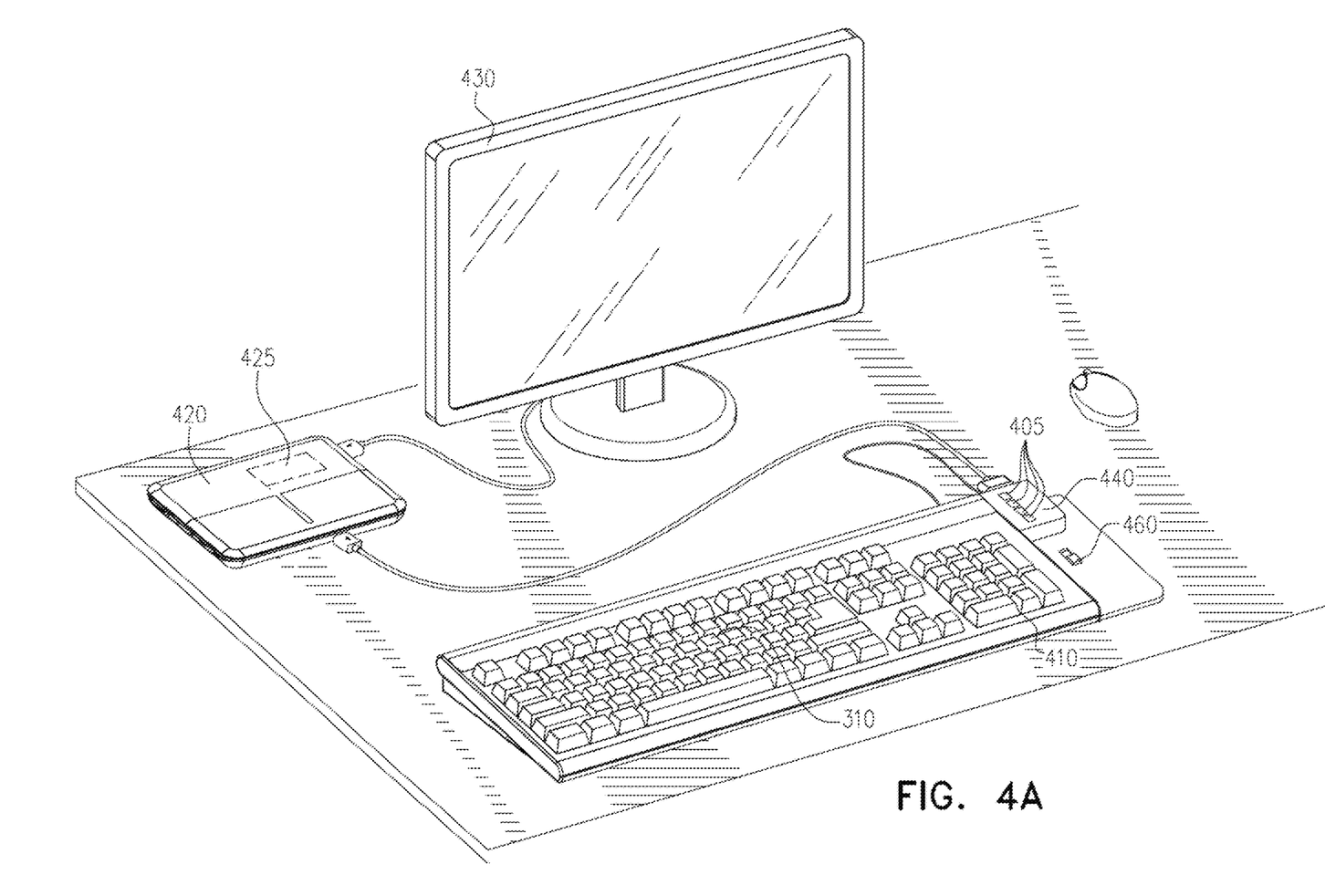
FIGS. 4A-4B are schematic illustration of a computer with a keyboard having a switching circuit, according to an embodiment of the disclosure.
Figure 4B:
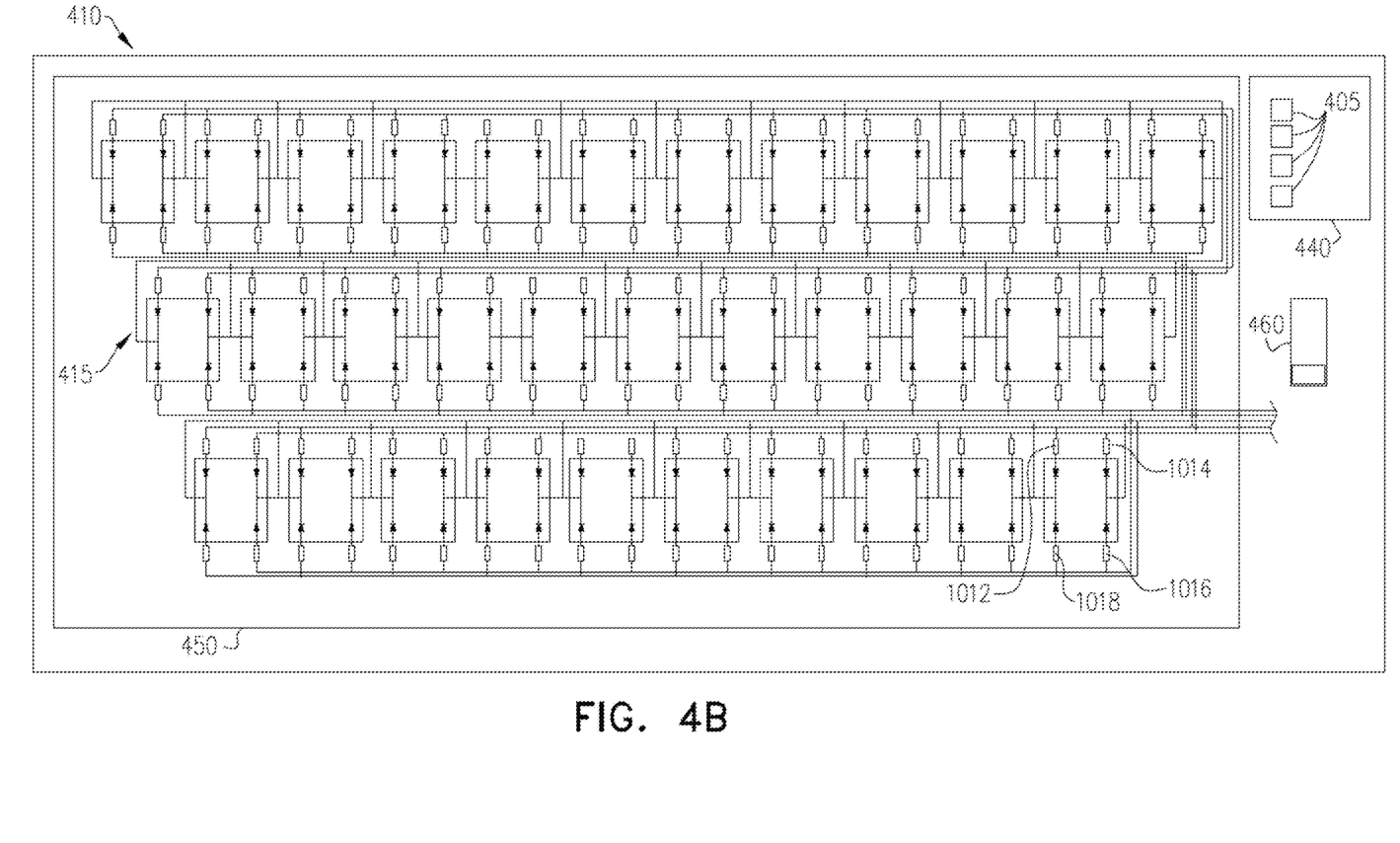

Reference is now made to FIGS. 4A-4B, which are schematic illustrations of a computer 420 with a keyboard 410 having a switching circuit 415, according to an embodiment of the disclosure. Optionally, the electronic switching circuit 415 is controlled by a controller 440 that includes switches 405 to turn on or off lights for a set of keys 1000 (e.g., the letter keys 310) to illuminate a specific language. The controller 440 also connects the keyboard 410 to a computer 420 to receive power and instructions to turn on or turn off specific switches 405. The computer 420 may have a display 430 to show the status of the keyboard 410 to the user (e.g., an indication which language/key layout is selected and illuminated).

In the electronic switching circuit 415, each of four different electronic switches 405 are connected to each of four light sources (e.g., LED lights) that are located at four different areas of each of the keyboard keys 1000. In some embodiments, the electronic switches 405 may be connected to a printed circuit board (PCB) 450 wired to connect the light sources of each key 1000 to a respective switch 405.

The lights for illuminating the symbols may be mounted on the PCB 450 below the key as described above. In other embodiments, the number of light sources and symbols for each key may be more than four or less than four, for example 2, 3, 5 or 6. Optionally, each of the switches 405 controls operation of a set of light sources corresponding to a specific language (activating one light for each key). Optionally, each keyboard key 1000 is configured to display a letter of the same language at the same area for all keys 1000 of the keyboard 410 or for a selected group of keys 1000 of the keyboard 410 (e.g., letter keys 310 or upper numeric keys 320). Thus, when one light source of one key is operated, i.e., switched 'ON' at one area of a keyboard key, the other light sources of that same keyboard key are switched 'OFF', whereas light sources of other keyboard keys at the same designated area as the area switched 'ON' in one keyboard key, are also switched 'ON' thereby providing a full display of all letters or icons related to a specific language or key layout, on all keyboard keys of the selected area at once.

Alternatively or additionally, two or more languages from the available languages may be illuminated together, for example two of four languages illuminated and two of four languages turned off. This option may be used with special instructions for the user provided on the display 430, for example defining which symbol of the two will be used by the computer 420 when the user presses a key 1000. Optionally, the two symbols may be illuminated with different colors and the display may indicate, which color takes preference. Optionally, one of the two symbols may be used when holding the "Shift" key or other special selection key.

When a different language is selected by the user, the switches 405 of the corresponding light sources of the selected language, switch those light sources 'ON', while switching the light sources at the designated areas of other different language(s) 'OFF'.

In some embodiments, control of the light switches 405 is initiated by the user's computer that the keyboard 410 is connected to, either via wire(s) or wirelessly. Optionally, the light sources may be switched 'ON' or 'OFF' by a designated selection switch 460 or buttons (e.g., on the keyboard, which enables language selection), by a pre-selected key sequence (e.g., Alt-Shift) or by a program 425 executed by the computer (e.g., via a designated driver or computer software program that selects the active language). The driver or computer software program 425 identifies the language currently selected by the user and controls illumination of the light sources located beneath the corresponding characters or symbols of that selected language, by controlling operation of the switches 405 connected to the light sources. That is, the driver or computer program 425 is responsible for communication between the keyboard, e.g., keyboard 410, and computer 420, and controls operation of the keyboard 410.

In some embodiments of the disclosure, the illuminates areas of the keyboard keys 1000 may be selected responsive to a key sequence pressed by the user, for example changing the selected language (e.g., with Alt-Shift or other sequences) or by changing specific symbols of groups of keys, for example showing capital letters or lower case letters in different areas of the keyboard keys 1000 responsive to holding the Shift key or toggling the Caps Lock key or Num Lock Key. Likewise, the upper numeric keys 320 may show numbers or other symbols (e.g., '4' or '$') responsive to pressing the "Shift" key. In a similar manner the illuminated symbol may change responsive to holding the "Ctrl" key, "Alt" Key, "FN" key, "Window" key or any other key. Alternatively, the illuminated keys and symbols may be selected by a program on the computer connected to the keyboard.

In an embodiment of the disclosure, some of the keys may support more symbols than others, for example the letter keys 310 may have three or four different symbols on each key representing three or four different languages or layouts, and the upper numeric keys 320 may have only two different symbols.

In an embodiment of the disclosure, each key of the entire keyboard 410, shows only a single illuminated symbol at any moment, representing the current symbol that will be transmitted to the computer 420 when pressed. Alternatively, only keys which have letters will be illuminated or blanked out whereas keys that select the symbol by pressing the Shift Key or toggling the Caps Lock or Num Lock will continue to show two or more symbols. Optionally, the non-letters may not be illuminated at all and may function as standard keyboard keys as known in the art.

In some embodiments, keyboard 410 is pre-manufactured to include keys 1000 with multiple symbols on the upper surface of each key and a controller 440 that is configured to selectively illuminate one of the symbols for a group of keys 1000, for example all symbols of a selected language.

Figure 5:
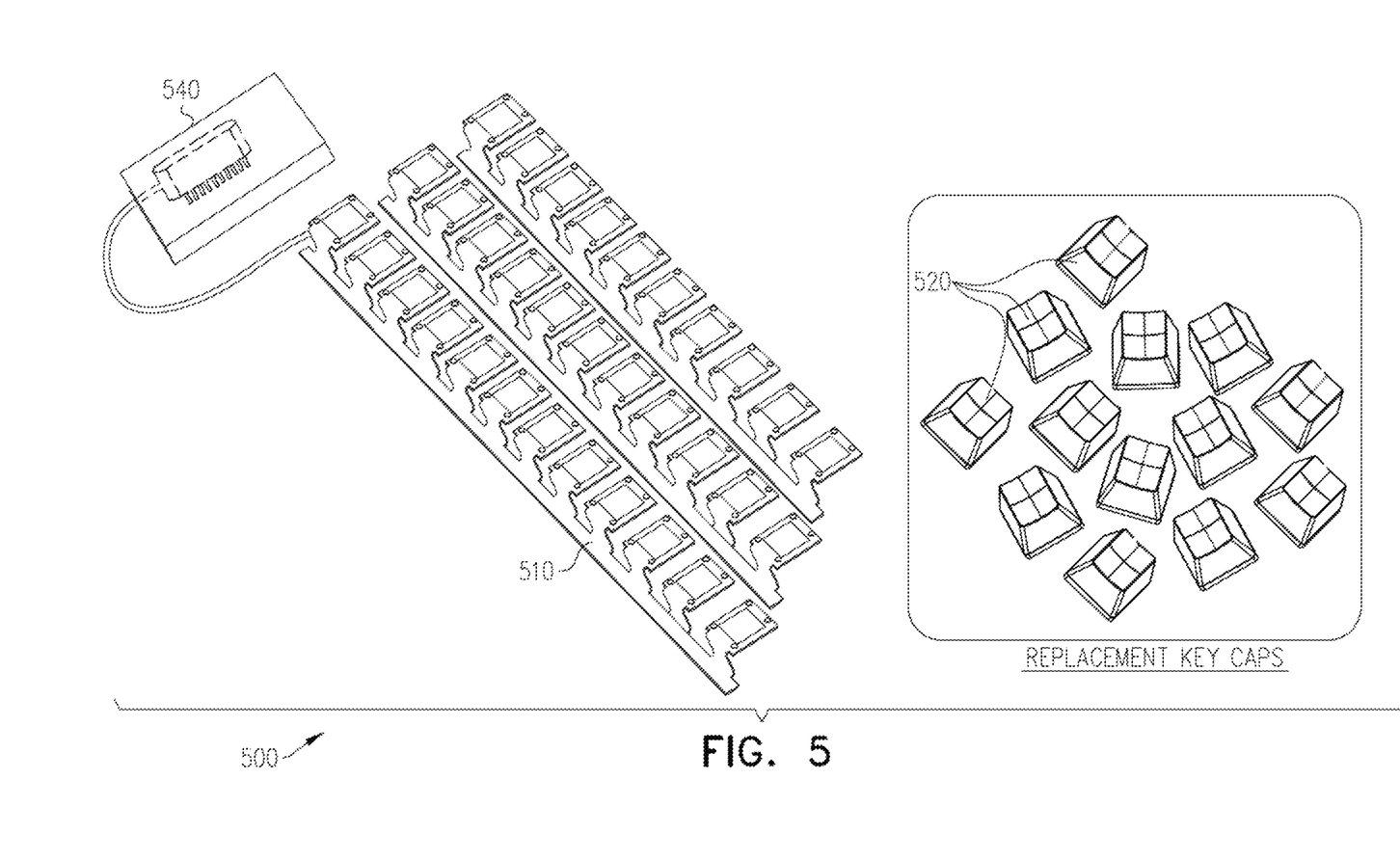
FIG. 5 is a schematic illustration of a retrofit kit for enhancing a keyboard, according to an embodiment of the disclosure.

Alternatively, a retrofit kit 500 may be used to form keyboard 410. As schematically illustrated in FIG. 5, retrofit kit 500 may include: a retrofit circuit 510, which includes a flexible PCB that fits over the underlying switches of the keys of a keyboard 410, a controller 540 to control illumination of light sources on the retrofit circuit 510 and replacement keycaps 520 (e.g., with transparent symbols) for the keys that will be illuminated. Optionally, the replacement keycaps 520 are configured to enable selectively illuminating a specific symbol while blocking illumination of the other symbols on the key.

Figure 6:
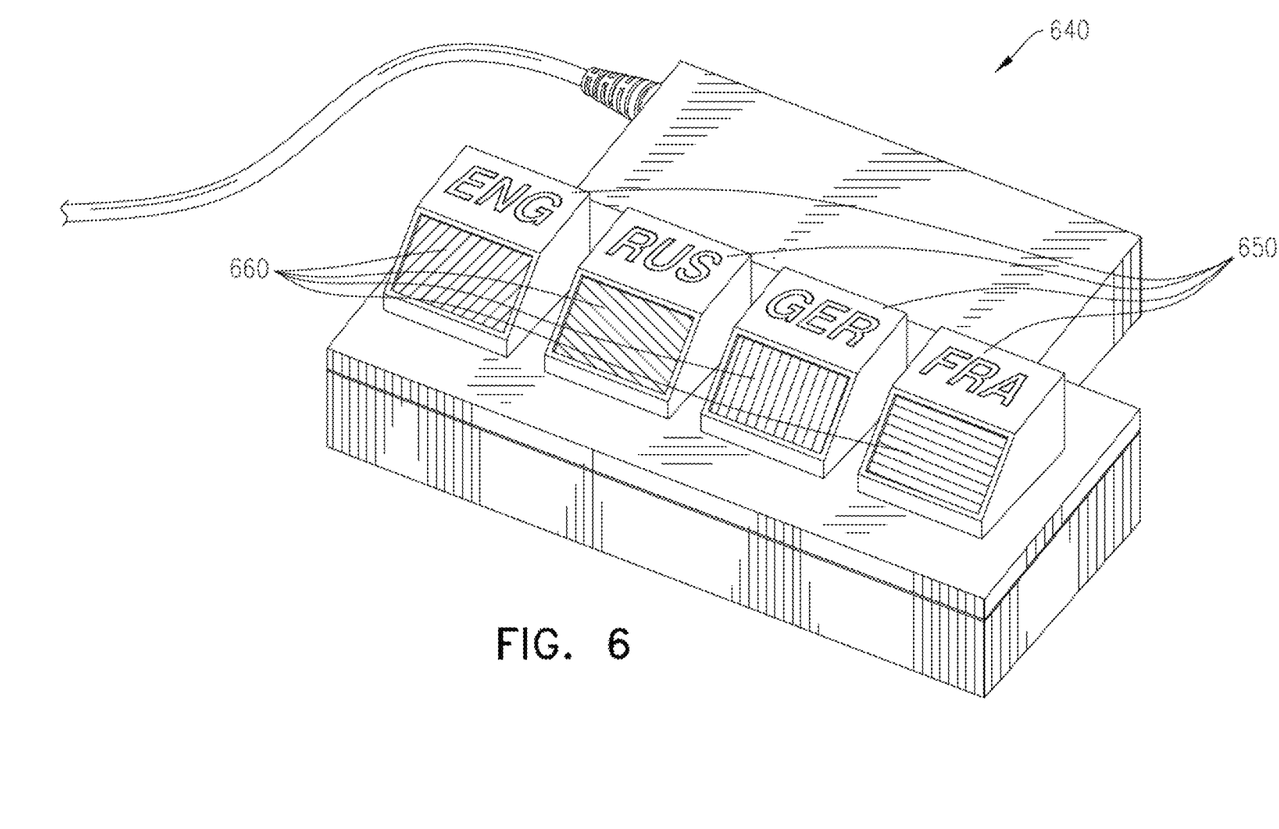
FIG. 6 is a schematic illustration of an external controller for selecting a language in a computer, according to an embodiment of the disclosure.

FIG. 6 is a schematic illustration of an external controller 640 for selecting a language in a computer 420, according to an embodiment of the disclosure. Controller 640 may enable the user to select the language or layout that is active on the computer 420 and may provide an indication to the user regarding the selected language. Optionally, controller 640 includes multiple (e.g., 4) switches/buttons 650 to select languages and each switch 650 includes a light 660 that is illuminated when the language is selected. Accordingly, the user can easily select a language by pressing a selected switch 650 and the user can identify, which language is selected by the light 660, which is illuminated on the switch 650. Optionally, the light 660 may have a different color for each language to enhance identification of the active language.

In some embodiments of the disclosure, controller 640 is independent of the keyboard 410, by communicating only with computer 420 irrespective of having an illuminated keyboard 410 or having a standard keyboard. In some embodiments, computer 420 may also be connected to a keyboard 410 and instruct keyboard 410 to illuminate respective symbols based on the language selected by controller 640.

Alternatively, controller 640 may be connected between computer 420 and keyboard 410. Optionally, controller 640 may communicate by wire or wirelessly with the computer 420 and/or the keyboard 410.

It should be appreciated that the above-described methods and apparatus may be varied in many ways, including omitting, or adding elements or steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure.

It will be appreciated by persons skilled in the art that the present invention is not limited to what has been particularly shown and described hereinabove. Rather the scope of the present invention is defined only by the claims which follow.

We claim:

1. An illuminated keyboard, comprising:
   one or more keys with multiple symbols engraved separately in different areas of an upper surface of each key;
   wherein at least one symbol on each key is illuminated at a specific moment during use;
   wherein if a single symbol is illuminated the single symbol is active;
   if two symbols are illuminated one is defined to take preference and be active, whereas the other is active when additionally pressing a preselected key;
   wherein the keyboard is configured to transmit the active symbol when pressing the key.

2. The keyboard of claim 1, wherein the active symbols of the one or more keys represent a layout of a language.

3. The keyboard of claim 2, wherein the symbols of the layout of the language match a selected language that is indicated on a display of a computer using the keyboard.

4. The keyboard of claim 1, wherein the active symbols of the one or more keys are toggled by pressing a pre-selected key or key sequence.

5. The keyboard of claim 1, wherein the active symbols of the one or more keys are toggled by a program on a computer connected to the keyboard.

6. The keyboard of claim 1, wherein the active symbols of the one or more keys are toggled by a selection switch or buttons on the keyboard.

7. The keyboard of claim 1, wherein the keyboard comprises a circuit with a light source for each symbol of each key of the one or more keys and a controller that selects which light sources will be turned on and which will be turned off.

8. The keyboard of claim 7, wherein the symbols on the keys are perforated or transparent to release light from a respective light source from under the symbol.

9. The keyboard of claim 7, wherein a partition is formed under each key with multiple symbols, the partition comprising walls that prevent light from a light source illuminating a symbol, from illuminating other symbols on the key.

10. The keyboard of claim 1, wherein the keyboard comprises a circuit with a light source for each symbol of each key and the symbols of different keys for each language or layout are of the same color.

11. The keyboard of claim 1, wherein the keyboard comprises a circuit with a light source for each symbol of each key and the symbols of different keys for different languages or layouts are a different color.

12. The keyboard of claim 1, wherein the symbols of a specific language are located in a same area on all the keys of the keyboard with symbols of the language.

13. The keyboard of claim 1, wherein pressing a "shift" key causes the keyboard to cease illumination of the numeric keys at the top of the keyboard and to commence illumination of the symbols above the numeric keys.

14. The keyboard of claim 1, wherein the keyboard includes different groups of keys with a different number of symbols per key.

15. The keyboard of claim 1, wherein the keyboard is formed by applying a retrofit kit to a standard keyboard.

16. The keyboard of claim 15, wherein the retrofit kit includes a flexible printed circuit that fits over underlying switches of the keys of the keyboard, a controller to control illumination of light sources on the flexible printed circuit and replacement keycaps for the keys that will be illuminated.

17. The keyboard of claim 1, wherein the keyboard is synchronized with the computer such that the illuminated symbols on the keyboard correspond to an indication on the computer display.

18. A method of illuminating a keyboard, comprising:
    providing a keyboard with one or more keys with multiple symbols engraved separately in different areas of an upper surface of each key;
    illuminating at least one symbol on each key at a specific moment during use; wherein if a single symbol is illuminated, the single symbol is active; if two symbols are illuminated one is defined to take preference and be active, whereas the other is active when additionally pressing a preselected key;
    transmitting, by the keyboard, the symbol that is active when pressing the key.

19. The method of claim 18, wherein the active symbols of the one or more keys represent a layout of a language.

20. The method of claim 19, wherein the symbols of the layout of the language match a selected language that is indicated on a display of a computer using the keyboard.

* * * * *